(12) United States Patent
Koehler et al.

(10) Patent No.: US 10,894,517 B2
(45) Date of Patent: Jan. 19, 2021

(54) DOGHOUSE RETAINER, DOOR ASSEMBLY INCORPORATING THAT DOGHOUSE RETAINER AND METHOD OF ADJUSTING A GAP BETWEEN A FIRST COMPONENT AND A SECOND COMPONENT

(71) Applicant: FORD GLOBAL TECHNOLOGIES, LLC, Dearborn, MI (US)

(72) Inventors: Juergen Koehler, Cologne (DE); Javier Polo, Cologne (DE); Linh Ngoc Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 16/402,750

(22) Filed: May 3, 2019

(65) Prior Publication Data
US 2020/0346530 A1 Nov. 5, 2020

(51) Int. Cl.
| | | |
|---|---|---|
| *B60J 5/00* | (2006.01) | |
| *B60R 13/02* | (2006.01) | |
| *B60J 5/04* | (2006.01) | |
| *F16B 5/00* | (2006.01) | |

(52) U.S. Cl.
CPC ......... *B60R 13/0206* (2013.01); *B60J 5/0463* (2013.01); *B60J 5/0468* (2013.01); *B60R 13/0243* (2013.01); *F16B 5/0096* (2013.01)

(58) Field of Classification Search
CPC ...... B60J 5/0463; B60J 5/0468; B60J 5/0413; B60J 5/0481; B60R 13/0206; B60R 13/0202; B60R 13/0212; B60R 13/0256; B60R 13/0262; B60R 13/0268

USPC .......... 296/146.7, 191; 49/501, 502; 52/511; 24/297, 458
See application file for complete search history.

(56) References Cited

U.S. PATENT DOCUMENTS

| | | | | |
|---|---|---|---|---|
| 5,195,793 | A | * | 3/1993 | Maki ....................... F16B 5/128 24/297 |
| 9,216,703 | B2 | * | 12/2015 | Lauxen ................. F16B 5/0657 |
| 10,138,922 | B2 | * | 11/2018 | Dickinson ............. F16B 43/001 |
| 2017/0233013 | A1 | * | 8/2017 | Dureiko .............. B60R 13/0206 296/191 |

FOREIGN PATENT DOCUMENTS

| | | |
|---|---|---|
| CN | 103273891 B | 11/2015 |
| DE | 102016201355 A1 | 8/2016 |
| JP | 2005299839 A | 10/2005 |
| JP | 5145980 B2 | 2/2013 |
| JP | 2018114689 A | 7/2018 |

(Continued)

OTHER PUBLICATIONS

English Machine Translation of CN103273891B dated Nov. 18, 2015.

(Continued)

*Primary Examiner* — Dennis H Pedder
(74) *Attorney, Agent, or Firm* — David Coppiellie; Price Heneveld LLP

(57) ABSTRACT

A doghouse retainer includes a body having an end wall incorporating a clip receiver and a sidewall having an ultrasonic heating concentration feature. A door assembly is provided including a door inner and a door trim panel incorporating such a doghouse retainer. A method of adjusting a gap between two components is also provided.

13 Claims, 11 Drawing Sheets

(56) References Cited

FOREIGN PATENT DOCUMENTS

WO    2017141385 A1    8/2017

OTHER PUBLICATIONS

English Machine Translation of DE102016201355A1 dated Aug. 4, 2016.
English Machine Translation of JP2005299839A dated Oct. 27, 2005.
English Machine Translation of JP2018114689A dated Jul. 26, 2018.
English Machine Translation of JP5145980B2 dated Feb. 20, 2013.
English Machine Translation of WO2017141385A1 dated Aug. 24, 2017.

* cited by examiner

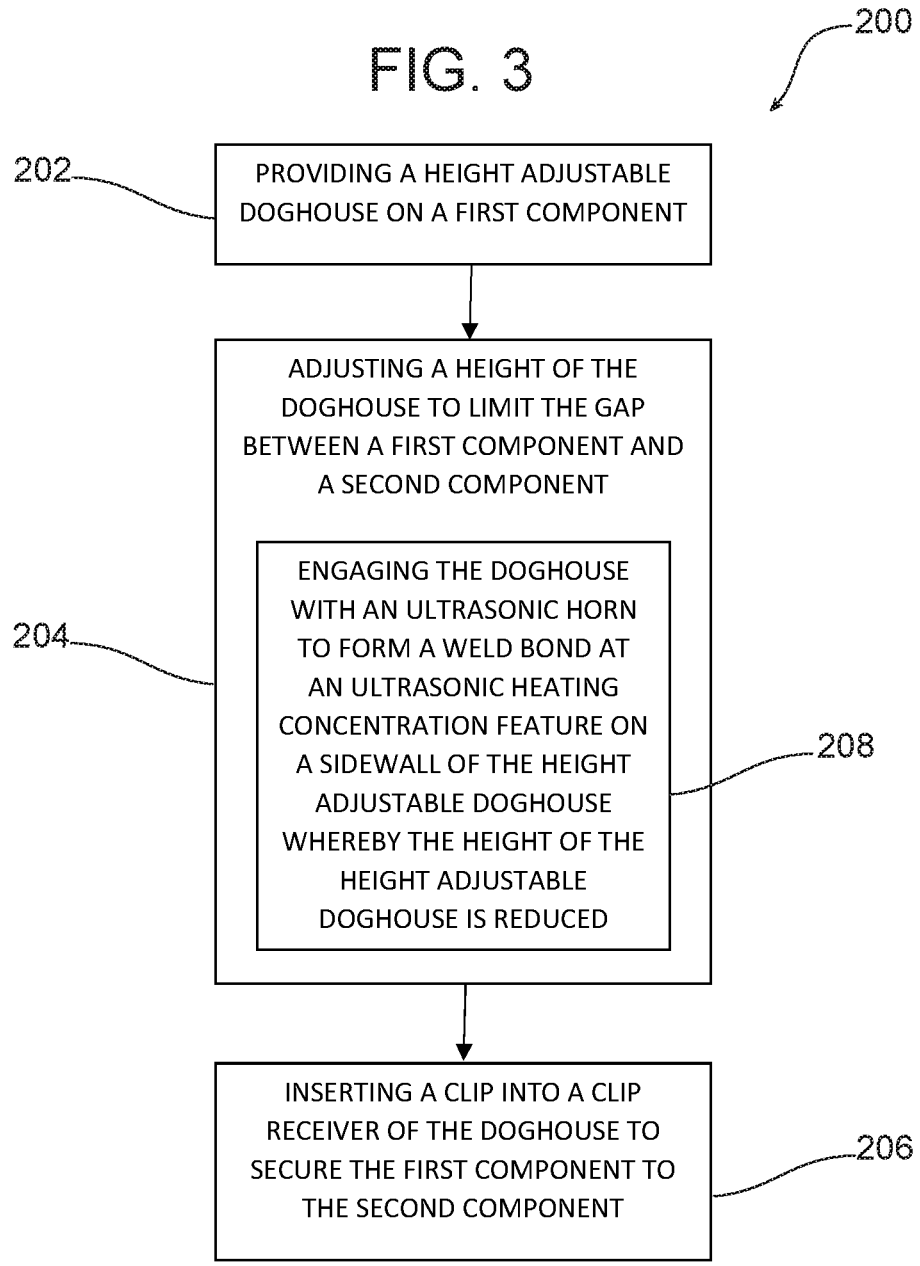

DOGHOUSE RETAINER, DOOR ASSEMBLY INCORPORATING THAT DOGHOUSE RETAINER AND METHOD OF ADJUSTING A GAP BETWEEN A FIRST COMPONENT AND A SECOND COMPONENT

TECHNICAL FIELD

This document relates generally to the motor vehicle equipment field and, more particularly to a new and improved doghouse retainer, a door assembly incorporating that doghouse retainer and a method of adjusting a gap between a first component and a second component of a motor vehicle.

BACKGROUND

Proper fit and finish between components of a motor vehicle is important for quality control. This document relates to a new and improved doghouse retainer that allows for adjustment of fit and finish and may be utilized to reduce gapping in between components to provide a more aesthetically pleasing appearance. This document also relates to a new and improved door assembly that incorporates that doghouse retainer as well as to a new and improved method of adjusting a gap between first and second components of a motor vehicle.

SUMMARY

In accordance with the purposes and benefits described herein, a new and improved doghouse retainer is provided. That doghouse retainer comprises a body including (a) an end wall having a clip receiver and (b) a sidewall having an ultrasonic heating concentration feature.

The sidewall may have a height $H_1$ prior to ultrasonic heating and a height $H_2$ following ultrasonic heating and converting of the ultrasonic heating concentration feature to a weld bond where $H_1 > H_2$.

The sidewall may include a collar projecting beyond the end wall. In one of the many possible embodiments of the doghouse retainer, the sidewall may include three faces. In such an embodiment, the ultrasonic heating concentration feature may extend across the three faces. Further, the sidewall may have a first thickness $T_1$ and the ultrasonic heating concentration feature may have a second thickness $T_2$ where $T_1 > T_2$. In some of the many possible embodiments of the doghouse retainer, the ultrasonic heating concentration feature may be a notch in the sidewall. In some of the many possible embodiments of the doghouse retainer, the ultrasonic heating concentration feature may be a step in the sidewall.

In some of the many possible embodiments of the doghouse retainer the sidewall may include four faces. In such an embodiment the ultrasonic heating concentration feature may extend across the four faces. Further, the sidewall may have a first thickness $T_1$ and the ultrasonic heating concentration feature may have a second thickness $T_2$ where $T_1 > T_2$. In some of these embodiments, the ultrasonic heating concentration feature may be a notch in the sidewall. In other of these embodiments, the ultrasonic heating concentration feature may be a step in the sidewall.

In accordance with an additional aspect, a new and improved door assembly is provided. That new and improved door assembly comprises a door inner and a door trim panel. The door trim panel includes a doghouse retainer having a body including (a) an end wall with a clip receiver and (b) a sidewall having an ultrasonic heating concentration feature. The sidewall may have a height $H_1$ prior to ultrasonic heating and a height $H_2$ following ultrasonic heating and converting of the ultrasonic heating concentration feature to a weld bond wherein $H_1 > H_2$.

The sidewall may include a collar projecting beyond the end wall. The ultrasonic heating feature may extend across the sidewall. That sidewall may have a thickness $T_1$ and the ultrasonic heating concentration feature may have a second thickness $T_2$ where $T_1 > T_2$.

In accordance with an additional aspect, a new and improved method is provided of adjusting a gap between a first component and a second component such as found in a motor vehicle. That method comprises the steps of: (a) providing a height adjustable doghouse on the first component, (b) adjusting a height of the height adjustable doghouse to limit the gap between the first component and the second component and (c) inserting a clip into a clip receiver of the doghouse to secure the first component to the second component. In one or more of the many possible embodiments of the method, the method may further include the step of engaging the doghouse with an ultrasonic horn to form a weld bond from an ultrasonic heating concentration feature on a sidewall of the height adjustable doghouse whereby the height of the height adjustable doghouse is reduced.

In the following description, there are shown and described several preferred embodiments of the doghouse retainer, the door assembly and the method of adjusting a gap between a first component and a second component. As it should be realized, the doghouse retainer, the door assembly and the method are capable of other, different embodiments and their several details are capable of modification in various, obvious aspects all without departing from the doghouse retainer, door assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the doghouse retainer, the door assembly and the method and together with the description serve to explain certain principles thereof.

FIGS. 1A-1D are a series of detailed perspective views of a first embodiment of the doghouse retainer, the door assembly and the method of adjusting a gap between a first component and a second component of that door assembly.

More particularly, FIG. 1A illustrates the doghouse retainer in an original condition prior to undergoing height adjustment.

FIGS. 2B and 2C illustrate the doghouse retainer of FIG. 2A undergoing height adjustment by application of ultrasonic heating along an ultrasonic heating concentration feature provided on the sidewall of the doghouse retainer through contact with an ultrasonic horn.

FIG. 2D illustrates the doghouse retainer following the height reduction process as well as the reduced gap provided between the first component or door inner and second component or door trim panel.

FIG. 3 is a schematic block diagram of the method of adjusting a gap between a first component and a second component.

Reference will now be made in detail to the present preferred embodiments of the doghouse retainer, the door assembly and the method, examples of which are illustrated in the accompanying drawing figures.

DETAILED DESCRIPTION

Reference is now made to FIGS. 1A-1D illustrating a first doghouse retainer 10 that allows for height adjustment to provide better gap control and a more aesthetically pleasing appearance between components such as those found in a motor vehicle. The doghouse retainer 10 is integrally molded on the B surface 12 of a first component 14, such as a door trim panel of a motor vehicle.

Figure 1A:
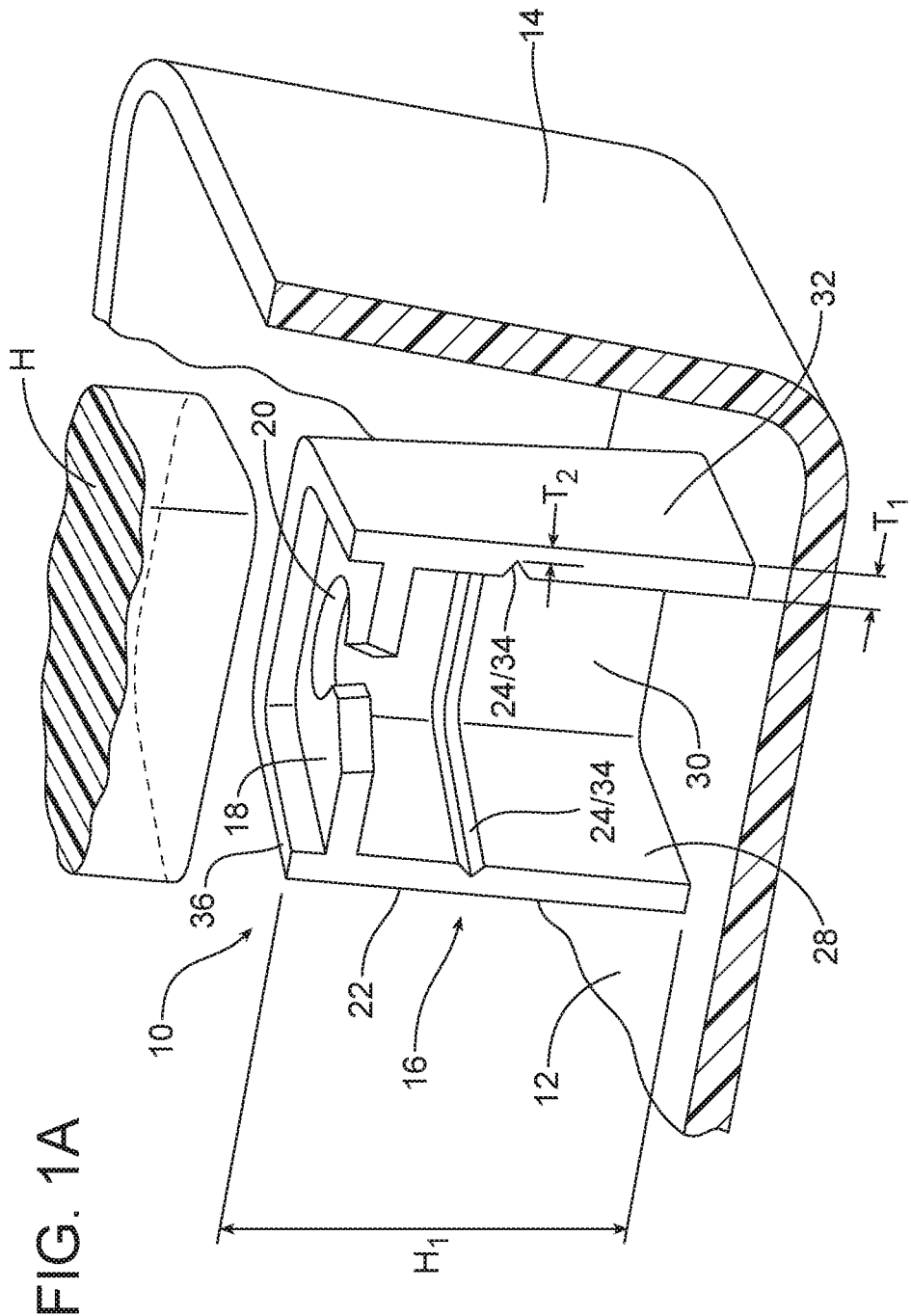
FIG. 1A illustrates the doghouse retainer in an original condition before undergoing height adjustment.
Figure 1B:
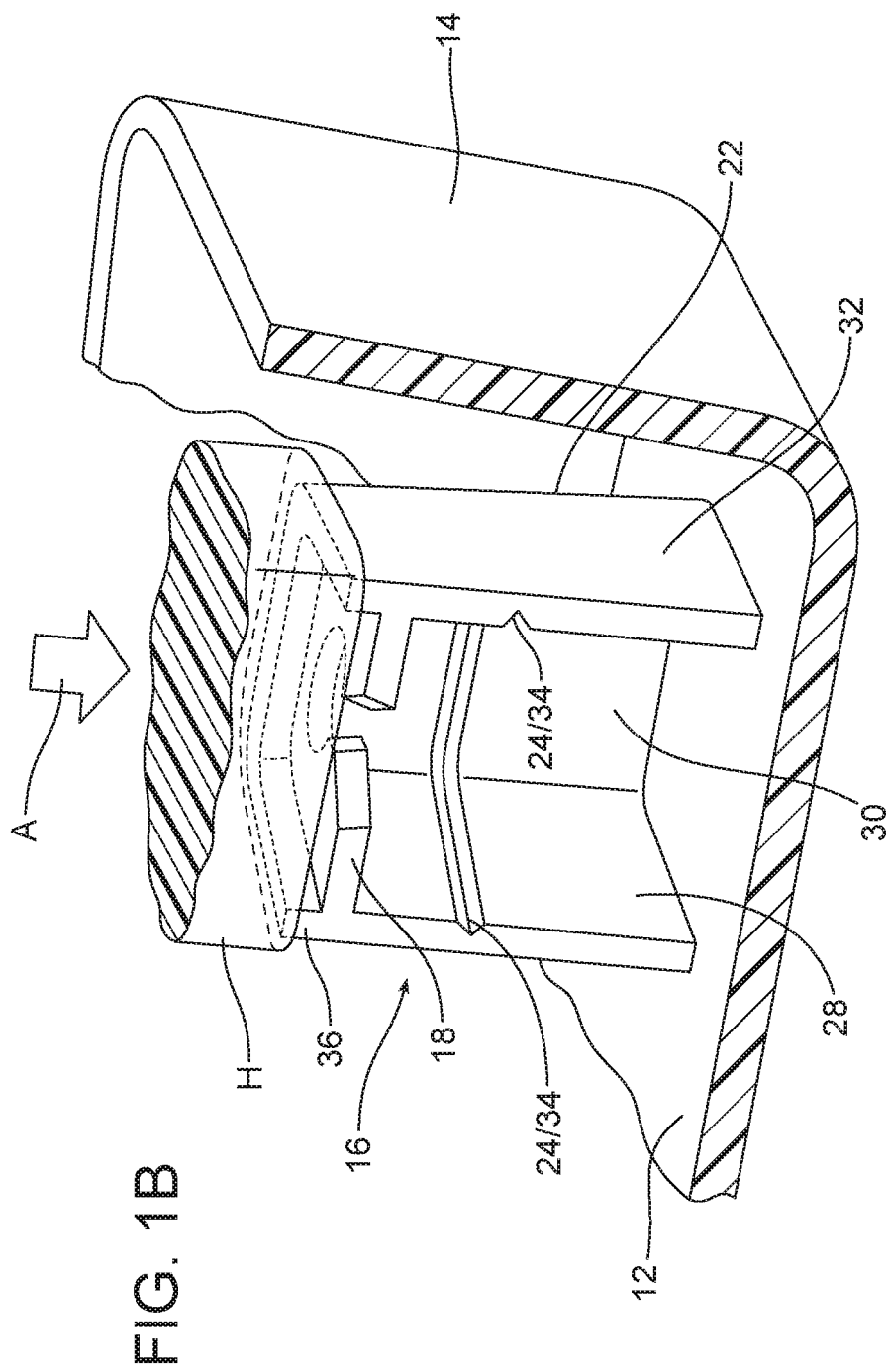
FIGS. 1B and 1C illustrate the doghouse retainer of FIG. 1A undergoing height adjustment by application of ultrasonic heating along an ultrasonic heating concentration feature provided on the sidewall of the doghouse retainer through contact with an ultrasonic horn.
Figure 1C:
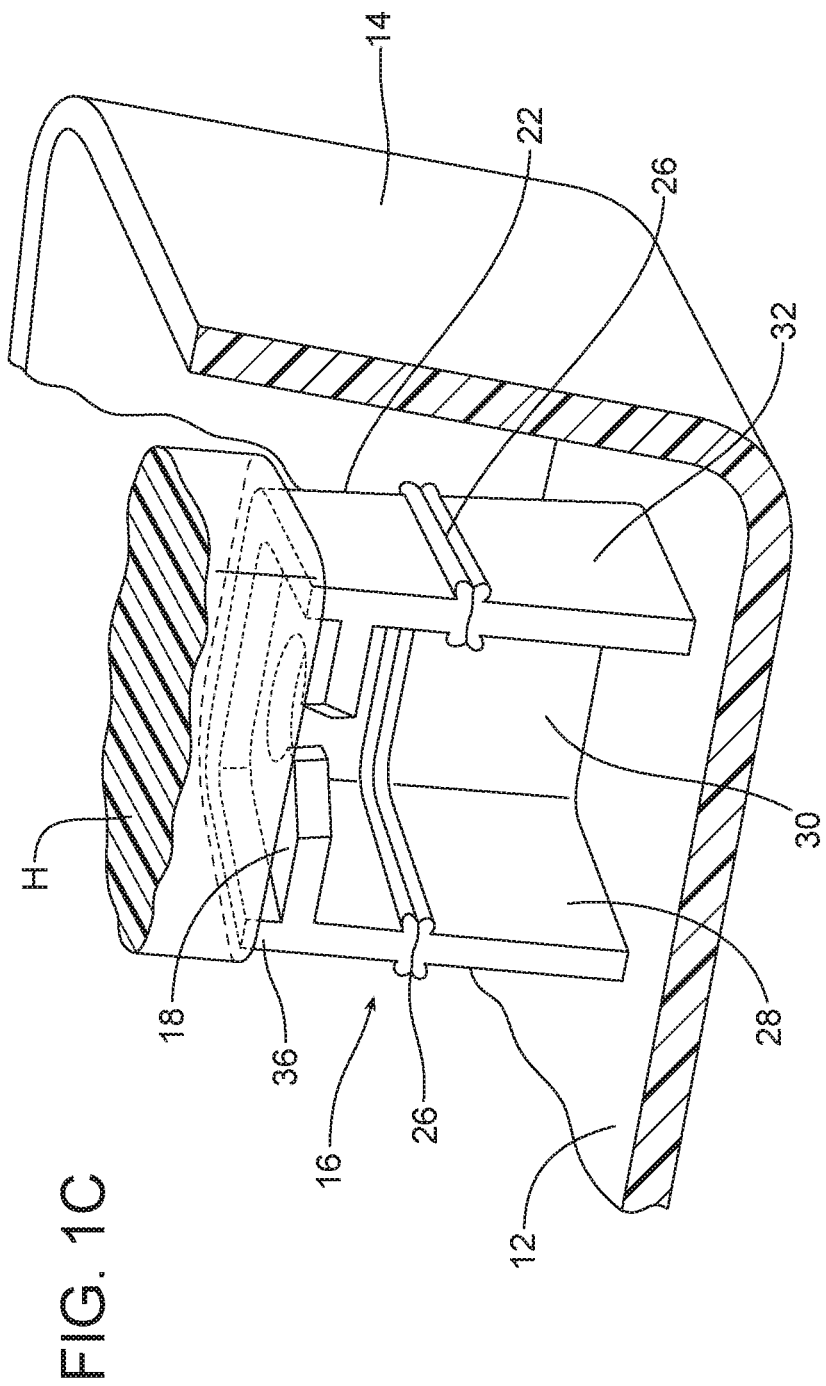
Figure 1D:
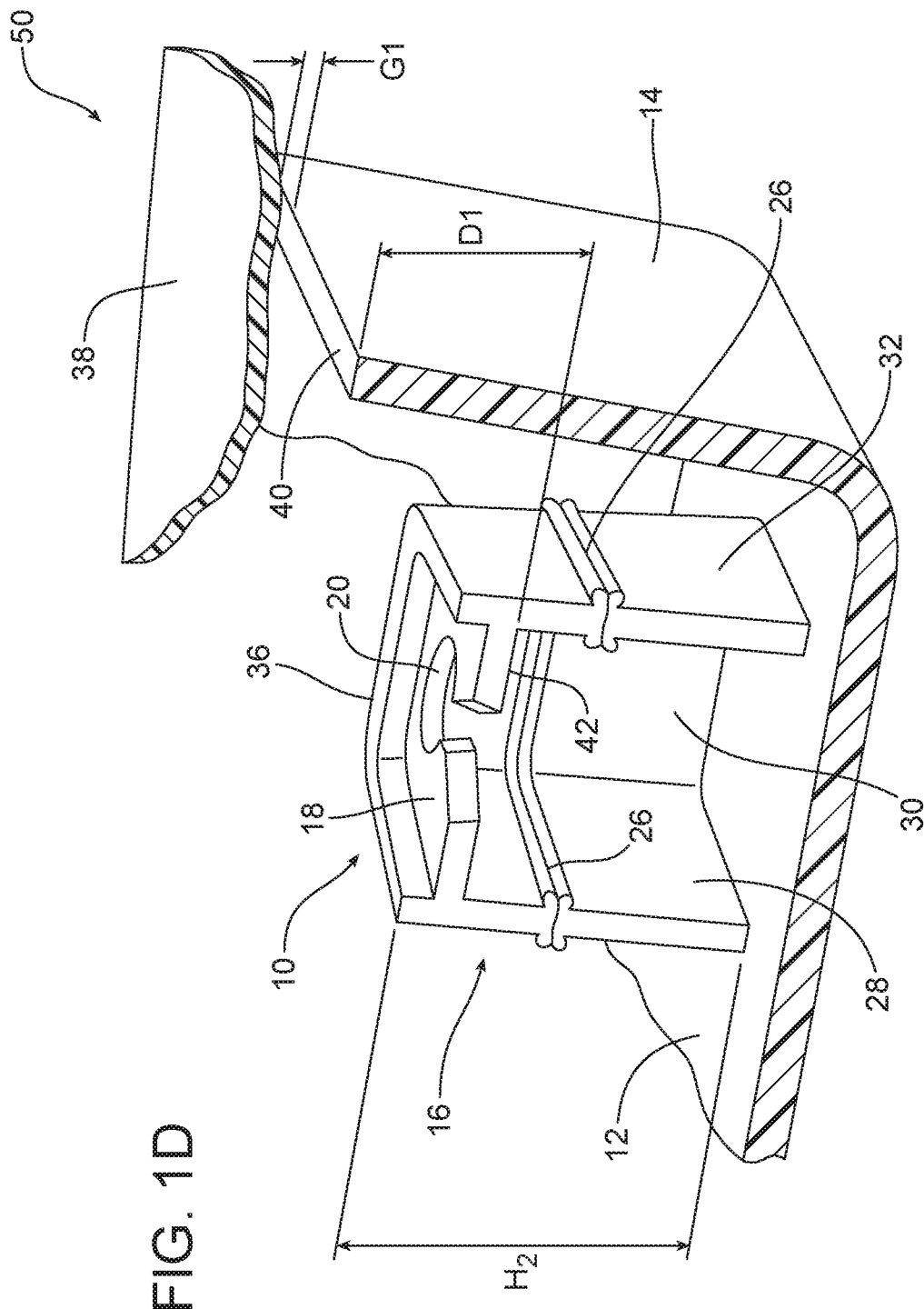
FIG. 1D illustrates the doghouse retainer following the height reduction process as well as the reduced gap provided between the first component or door inner and second component or door trim panel.

As illustrated, the doghouse retainer 10 has a body 16 including an end wall 18. End wall 18 includes a clip receiver 20, of a type known in the art. The body 16 also includes a sidewall 22 having an ultrasonic heating concentration feature 24. More particularly, as illustrated in FIG. 1A, the sidewall 22 has a height $H_1$ prior to ultrasonic heating and as illustrated in FIG. 1D a height $H_2$ following ultrasonic heating and converting of the ultrasonic heating concentration feature 24 to a weld bond 26 where $H_1 > H_2$. More particularly, the sidewall 22 of the embodiment illustrated in FIGS. 1A-1D includes three faces 28, 30, 32. As shown, the ultrasonic heating concentration feature 24 extends continuously across all three faces 28, 30, 32.

More particularly, as illustrated in FIGS. 1A-1D, the ultrasonic heating concentration feature 24 comprises a notch, and more particularly, a V-shaped notch 34 formed in the three faces 28, 30, 32 of the sidewall 22. Here it should be noted that the sidewall 22 has a first thickness $T_1$ and the ultrasonic heating concentration feature 24 or V-shaped notch 34 has a second thickness $T_2$ where $T_1 > T_2$.

As further illustrated in FIGS. 1A-1D, the sidewall 22 also includes a collar 36 projecting beyond the end wall 18. In order to adjust the height of the doghouse retainer 10, an ultrasonic horn H is displaced in the direction of action arrow A into engagement with the collar 36 at the top of the sidewall. Compare FIG. 1A to FIG. 1B. The force and high frequency mechanical motion applied through the ultrasonic horn H results in high frictional heating along the ultrasonic heating concentration feature 24 or V-shaped notch 34 resulting in the formation of the weld bond 26. The weld bond 26, in turn, reduces the length of the sidewall 22 and the effective height $H_2$ of the doghouse retainer 10 with that length reduction increased or decreased by adjusting the ultrasonic welding process parameters including pressure, energy, frequency and time. This allows the height adjustment to be customized to provide the best possible gap control between the first component 14 or door trim panel and the second component 38 or support substrate/door inner. Note FIG. 1D illustrating the final gap $G_2$ between the two components 14 and 38 and note $D_1$ illustrating the distance from the edge 40 of the first component to the engagement face 42 of the clip receiver 20. Here it should be appreciated that FIG. 1D illustrates the new and improved door assembly 50 comprising a first component 14 or door trim panel including the doghouse retainer 10 and the second component 38 or door inner.

Figure 1E:
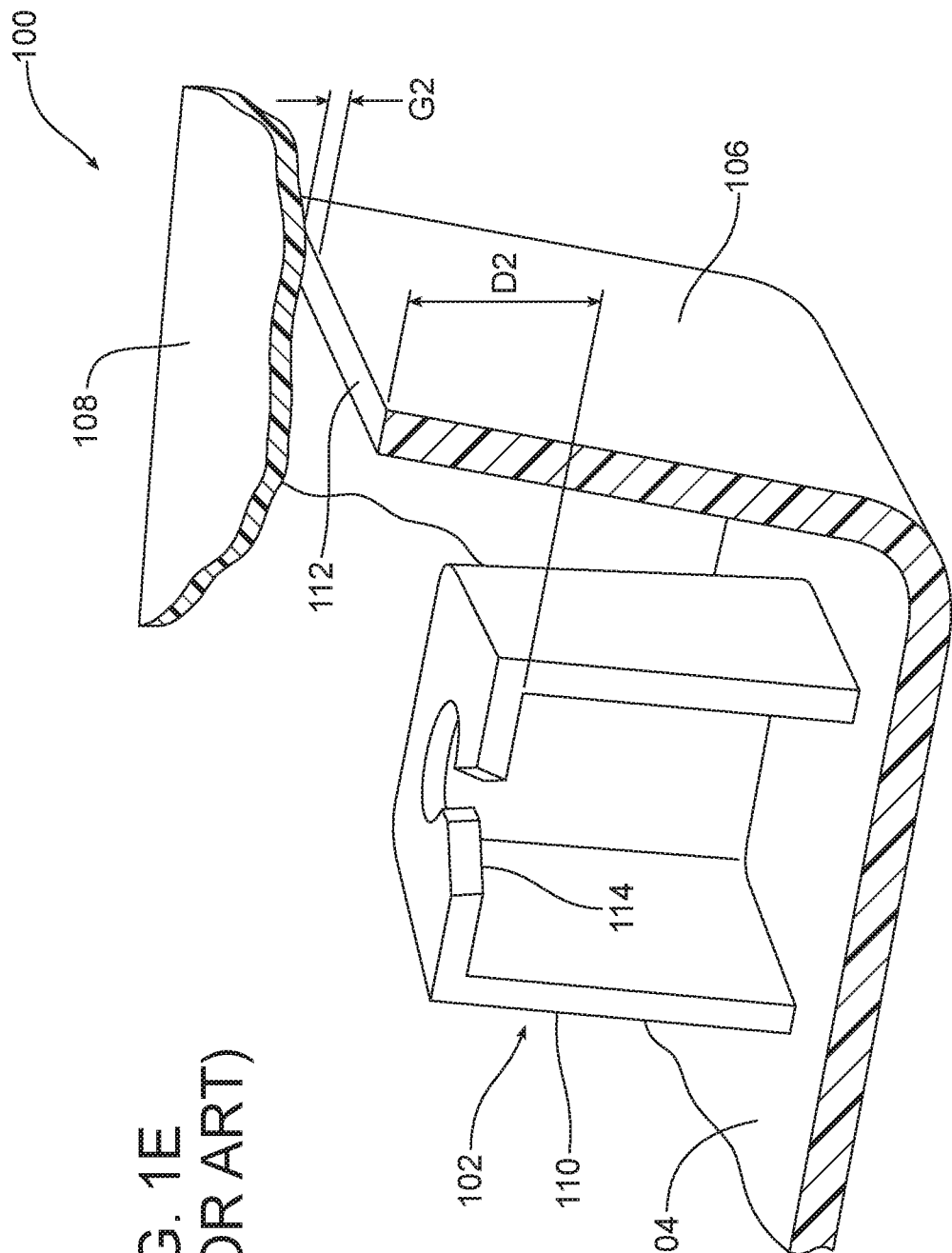
FIG. 1E illustrates the gap on a prior art door assembly incorporating a prior art doghouse retainer without the height adjustment feature of the present doghouse retainer as illustrated in FIGS. 1A-1D.

For purposes of comparison, FIG. 1E illustrates a prior art door assembly 100 including a doghouse retainer 102 carried on the B-surface 104 of the door trim panel 106 and a door inner 108. Note that the prior art doghouse retainer 102 includes a continuous sidewall 110 without any ultrasonic heating concentration feature to allow for height adjustability. As a result, the height of the doghouse retainer cannot be adjusted and the distance $D_2$ between the edge 112 of the door trim panel 106 and the engagement face 114 of the clip receiver 116 cannot be adjusted. As a result, a relatively large gap $G_2$ is provided between the edge 112 of the door trim panel 106 and the door inner 108 as compared to the smaller gap $G_1$ provided by the new and improved door assembly 50 incorporating the height adjustable doghouse retainer 10 illustrated in FIGS. 1A-1D.

Reference is now made to FIGS. 2A-2D illustrating an alternative embodiment of the doghouse retainer 10. Identical reference numbers are utilized to identify like structural features that are shared between the two different embodiments of the doghouse retainer 10 illustrated in FIGS. 1A-1D and 2A-2D.

The doghouse retainer 10 illustrated in FIGS. 2A-2D differs from the doghouse retainer 10 illustrated in FIGS. 1A-1D by: (1) the sidewall 22 comprising four faces 52, 54, 56, 58 instead of three faces 28, 30, 32 and the ultrasonic heating concentration feature 24 comprising a step 60 instead of a V-shaped notch 34. The first face 52 of the sidewall 22 is partially broken away in drawing FIGS. 2A-2D to better illustrate the four faces 52, 54, 56, 58 of the sidewall 22.

Figure 2A:
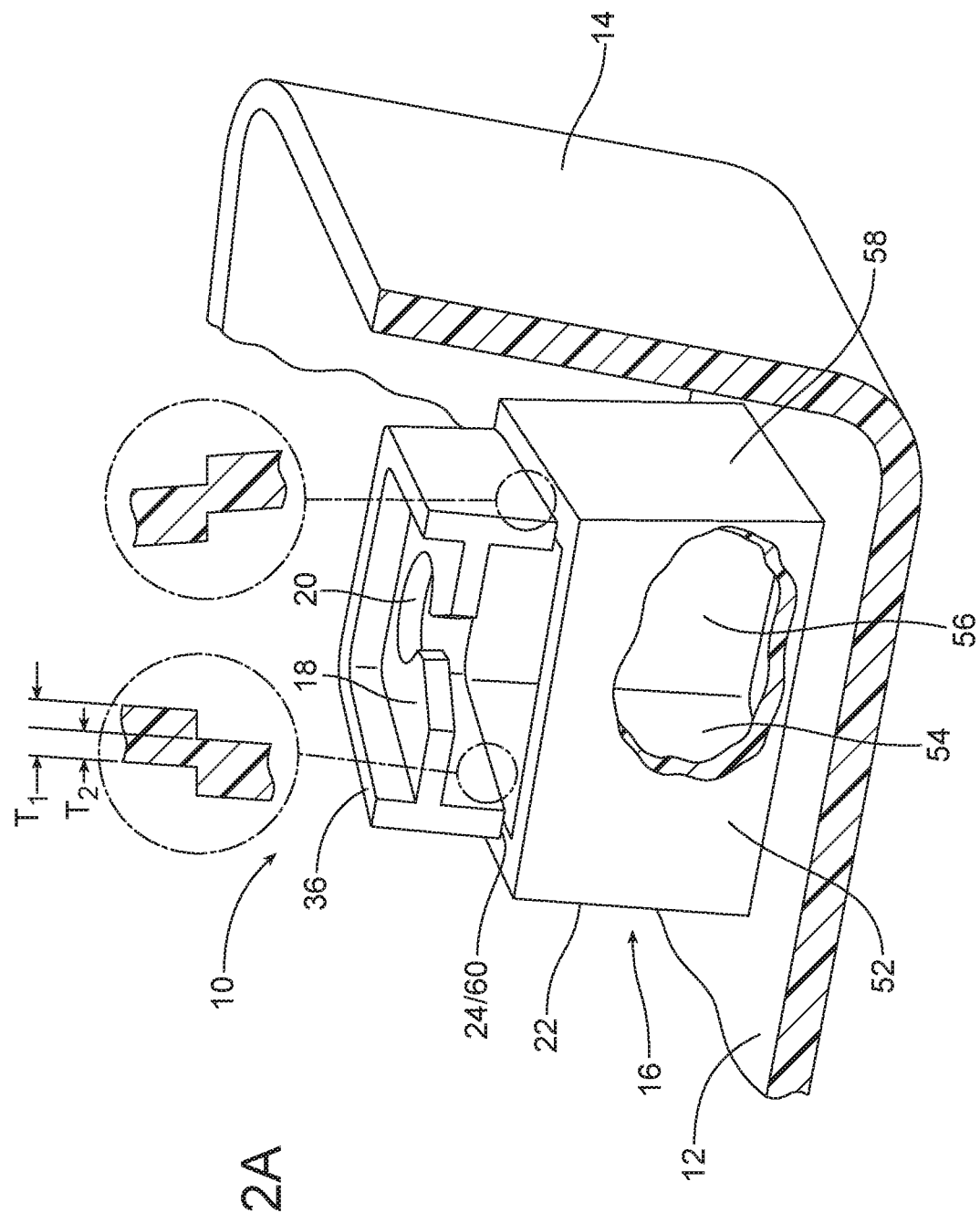
FIGS. 2A, 2B, 2C and 2D are a series of detailed perspective views of a first alternative embodiment of the doghouse retainer, the door assembly and the method of adjusting a gap between a first component and a second component of that door assembly. More particularly.
Figure 2B:
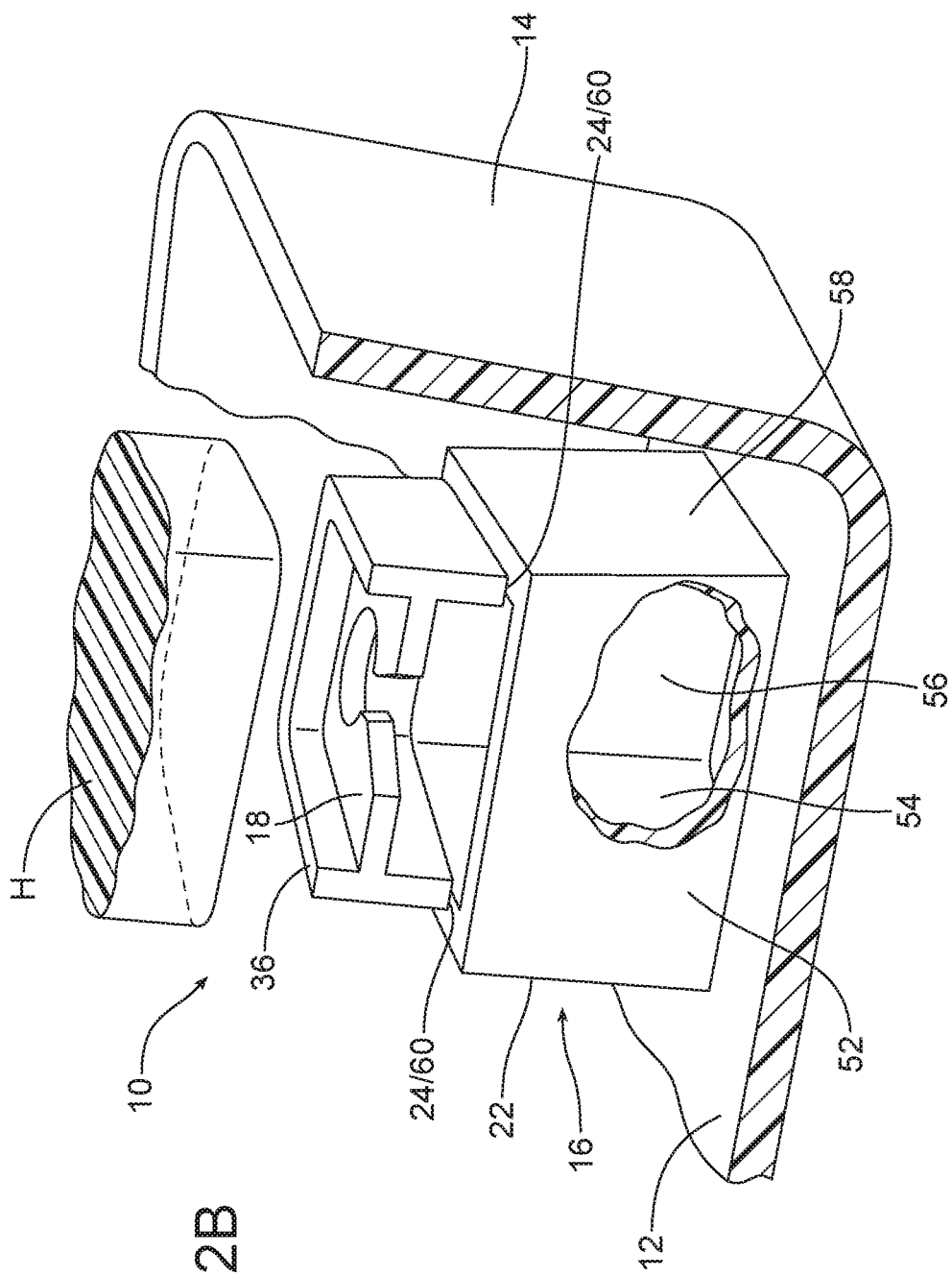
Figure 2C:
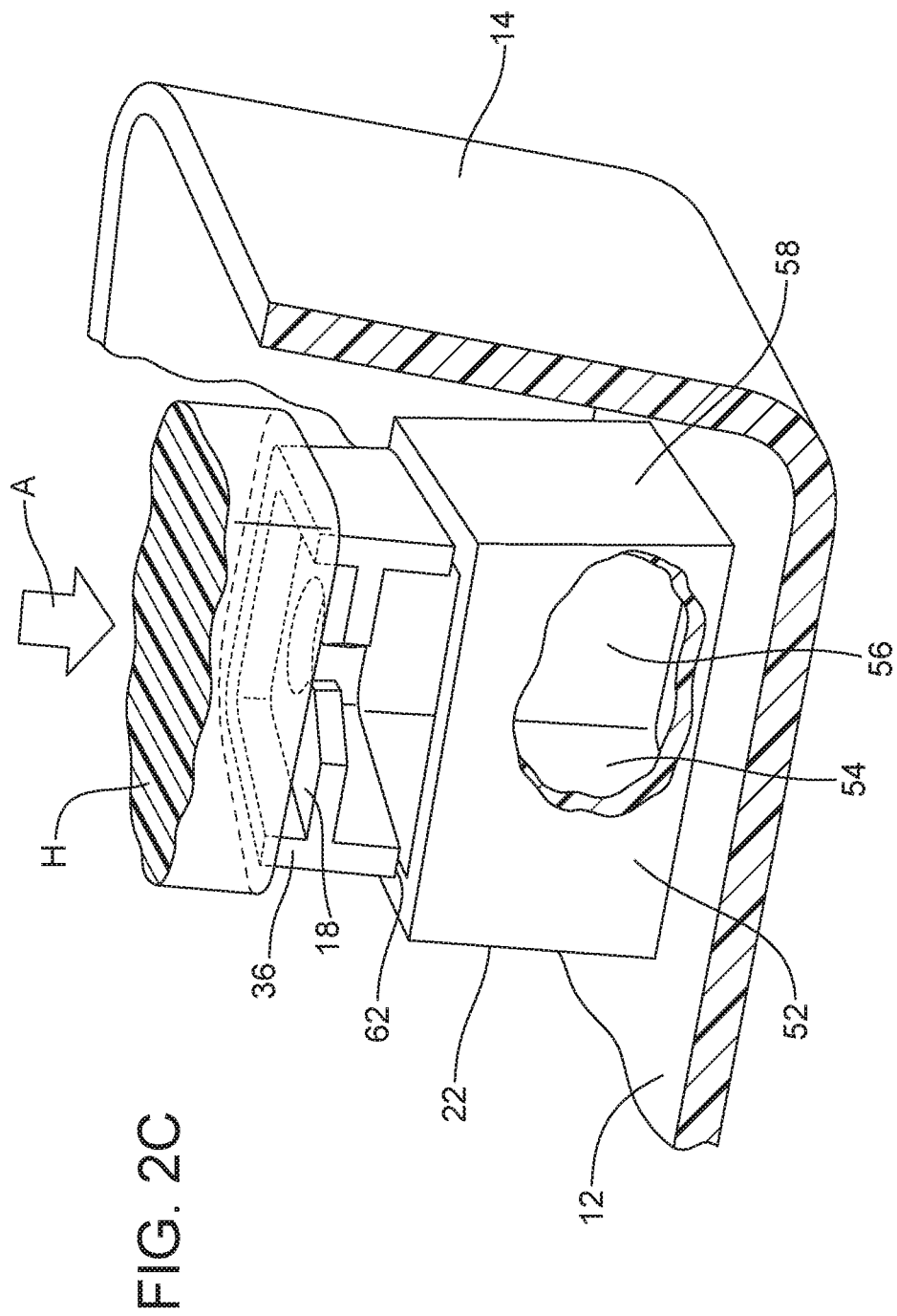
Figure 2D:
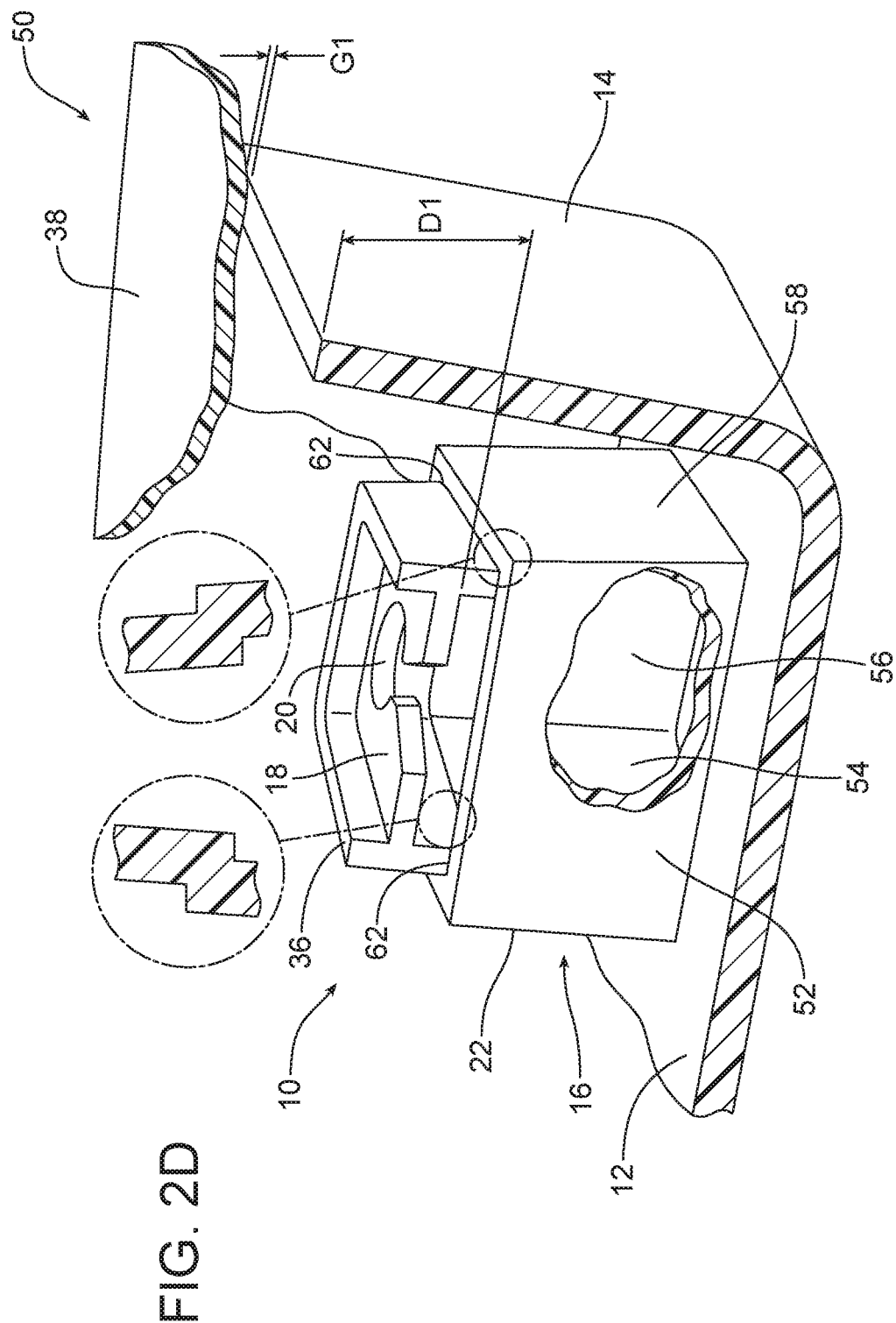

The height of the doghouse retainer 10 illustrated in FIGS. 2A-2D is adjusted in a similar manner to that described above with respect to the embodiment illustrated in FIGS. 1A-1D. More particularly, as illustrated in FIGS. 2B and 2C, an ultrasonic horn H is displaced into contact with the collar 36 of the sidewall 22 extending above the end wall 18 whereby force and high frequency mechanical motion are applied to the doghouse retainer 10 and concentrated particularly along the reduced thickness area provided across the four faces 52, 54, 56, 58 of the sidewall 22 causing the ultrasonic heating concentration feature 24/step 60 to form a weld bond 62. Once again, the weld bond 62 functions to reduce the length of the sidewall 22 and the overall height of the doghouse retainer 10. That length or height reduction can be increased or decreased by adjusting the ultrasonic welding process parameters including, for example, pressure, energy, frequency and time, to arrive at the desired adjustment to provide the best possible fit and finish and gap control between the two components 14, 38.

Figure 2E:
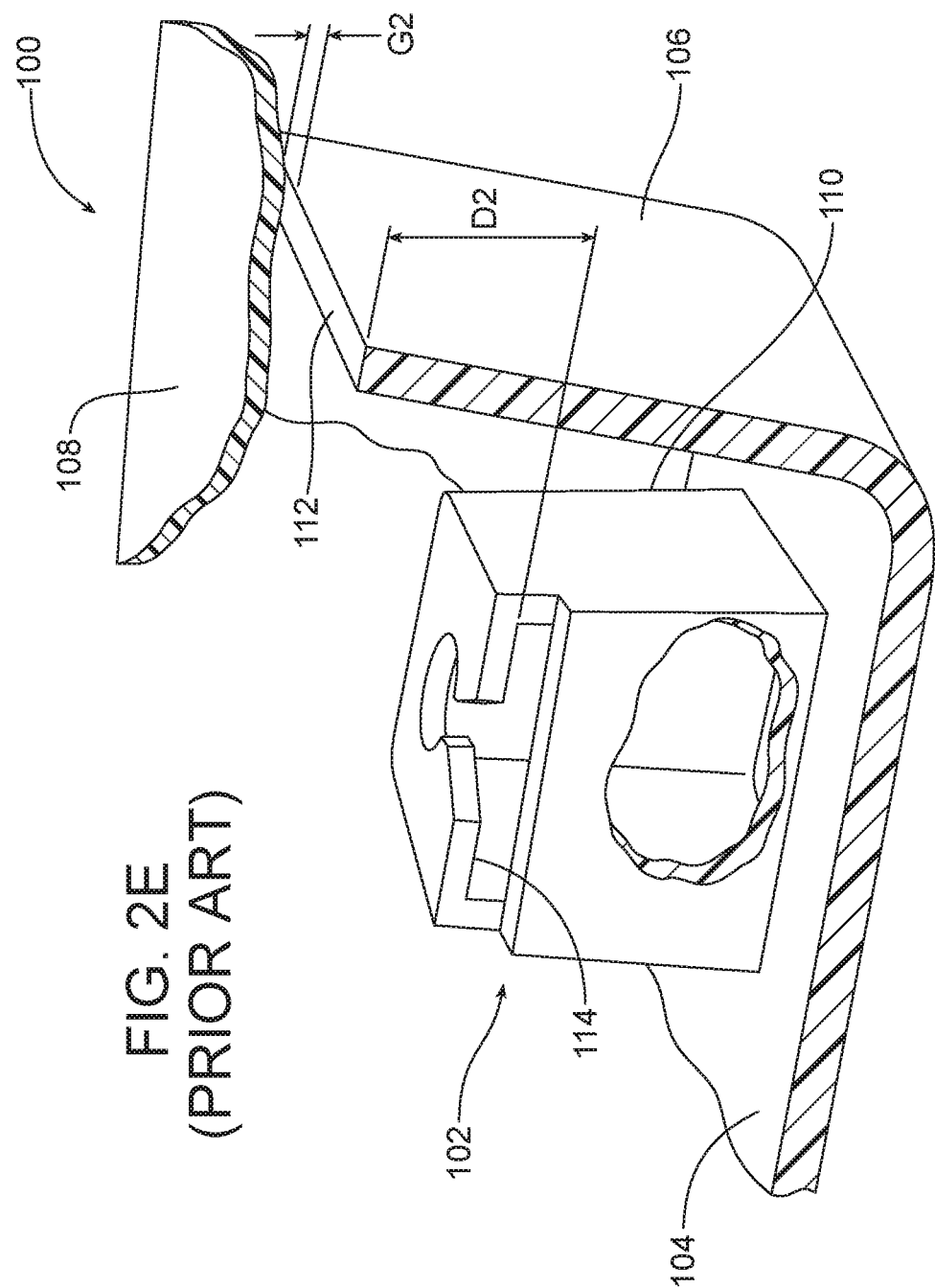
FIG. 2E illustrates the gap on a prior art door assembly incorporating a prior art doghouse retainer without the height adjustment feature of the present doghouse retainer as illustrated in FIGS. 2A-2D.

FIG. 2E is a view of a prior art door assembly 100 identical to the prior art door assembly 100 illustrated in FIG. 1E in every respect except for the sidewall 22 incorporating four faces 52, 54, 56, 58 instead of three faces 28, 30, 32. By comparing FIGS. 2D and 2E it is possible to realize the reduced gap and improved fit and finish provided by the new and improved door assembly 50 incorporating the height adjustable doghouse retainer 10 as illustrated in FIGS. 2A-2D. Note that the gap $G_1$ is significantly reduced in the new and improved door assembly 50 as compared to the gap $G_2$ of the prior art door assembly 100.

Consistent with the above description and the illustrations presented in FIGS. 1A-1D and 2A-2D, a new and improved method is provided of adjusting a gap $G_1$ between a first component 14 and a second component 38. As schematically set forth in FIG. 3, that method 200 may be broadly described as including the steps of providing a height adjustable doghouse retainer 10 on the first component 14 (see box 202), adjusting a height of the height adjustable doghouse retainer to limit the gap G between the first component 14 and the second component 38 (see box 204) and inserting a clip into a clip receiver 20 of the doghouse 18 to secure the first component to the second component (see box 206).

More particularly, as illustrated in FIG. 3, the method may further include the step of engaging the doghouse 18 and, more particularly, a collar 36 of the sidewall 22 of the doghouse extending above the end wall 18 with an ultrasonic horn H to form a weld bond 26/62 at an ultrasonic heating concentration feature 24 on the sidewall of the height adjustable doghouse whereby the height of the height adjustable doghouse retainer is reduced (see box 208). The method may further control the extent of the adjustment and reduction in height by controlling or adjusting ultrasonic welding process parameters including, for example, pressure, energy, frequency and time.

The new and improved height adjustable doghouse retainer 10, door assembly 50 and related method 200 utilize existing door trim panel ultrasonic equipment to allow for better gap control, improved fit and finish and a more aesthetically pleasing final appearance. As a result, the doghouse retainer 10, the door assembly 50 and the method 200 disclosed herein represent a significant advance in the art.

The foregoing has been presented for purposes of illustration and description. It is not intended to be exhaustive or to limit the embodiments to the precise form disclosed. Obvious modifications and variations are possible in light of the above teachings. For example, it should be appreciated that the doghouse retainer 10 and related method 200 have other applications than to the door assembly 50. More particularly, the doghouse retainer 10 and method 200 may be applied to interconnection of substantially any two components where gap control is a consideration. This includes, for example, any application where a push-pin or screw fastening is used for assembly such as for side door trim panels, trunk closure trim panels, pillar trim panels, quarter trim panels, trunk side trim panels and the like.

All such modifications and variations are within the scope of the appended claims when interpreted in accordance with the breadth to which they are fairly, legally and equitably entitled.

What is claimed:

1. A doghouse retainer, comprising:
a body including an end wall having a clip receiver and a sidewall having an end for molding to a panel and having an ultrasonic heating concentration feature, wherein the sidewall includes an opposing end with a collar projecting beyond the end wall, and wherein the sidewall includes at least three faces, wherein the ultrasonic heating concentration feature extends across the at least three faces.

2. The doghouse retainer of claim 1, wherein said sidewall has a height $H_1$ prior to ultrasonic heating and a height $H_2$ following ultrasonic heating and converting of said ultrasonic heating concentration feature to a weld bond where $H_1 > H_2$.

3. The doghouse retainer of claim 1, wherein said sidewall has a first thickness $T_1$ and said ultrasonic heating concentration feature has a second thickness $T_2$ where $T_1 > T_2$.

4. The doghouse retainer of claim 1, wherein said ultrasonic heating concentration feature is a notch in said sidewall.

5. The doghouse retainer of claim 1, wherein said ultrasonic heating concentration feature is a step in said sidewall.

6. The doghouse retainer of claim 1, wherein said sidewall includes four faces.

7. The doghouse retainer of claim 6, wherein said ultrasonic heating concentration feature extends across said four faces.

8. The doghouse retainer of claim 7, wherein said sidewall has a first thickness $T_1$ and said ultrasonic heating concentration feature has a second thickness $T_2$ where $T_1 > T_2$.

9. The doghouse retainer of claim 7, wherein said ultrasonic heating concentration feature is a notch in said sidewall.

10. The doghouse retainer of claim 7, wherein said ultrasonic heating concentration feature is a step in said sidewall.

11. A door assembly, comprising:
a door inner; and
a door trim panel including a doghouse retainer having a body including an end wall with a clip receiver and a sidewall having an end for molding to a panel and having an ultrasonic heating concentration feature, wherein the sidewall includes an opposing end with a collar projecting beyond the end wall, and wherein the sidewall includes at least three faces, wherein the ultrasonic heating concentration feature extends across the at least three faces.

12. The door assembly of claim 11, wherein said sidewall has a height $H_1$ prior to ultrasonic heating and a height $H_2$ following ultrasonic heating and converting of said ultrasonic heating concentration feature to a weld bond where $H_1 > H_2$.

13. The door assembly of claim 11, wherein said sidewall has a first thickness $T_1$ and said ultrasonic heating concentration feature has a second thickness $T_2$ where $T_1 > T_2$.

* * * * *